United States Patent [19]

Takagi et al.

[11] Patent Number: 4,523,935
[45] Date of Patent: Jun. 18, 1985

[54] ELECTRICAL HEATER RETAINED IN A POROUS CERAMIC STRUCTURE

[75] Inventors: Shigeru Takagi; Masahiro Tomita, both of Anjo, Japan

[73] Assignee: Nippon Soken, Inc., Nishio, Japan

[21] Appl. No.: 403,041

[22] Filed: Jul. 29, 1982

[30] Foreign Application Priority Data

Aug. 3, 1981 [JP] Japan .................. 56-120637

[51] Int. Cl.³ .................. B01D 39/20; F01N 3/02
[52] U.S. Cl. .................. 55/282; 55/466; 55/DIG. 10; 55/DIG. 30; 422/178; 60/303; 60/311; 219/267; 219/521; 219/522; 219/536; 219/544
[58] Field of Search .................. 55/282, 208, 466, 523, 55/DIG. 10, DIG. 30; 210/510; 422/178, 180, 212, 223; 60/300, 311, 303; 219/206, 267, 521, 522, 529, 536, 544; 428/312.6, 312.8, 319.1

[56] References Cited

U.S. PATENT DOCUMENTS

| 3,768,982 | 10/1973 | Kitzner et al. | 60/300 |
| 4,276,066 | 6/1981 | Bly et al. | 60/311 |
| 4,308,233 | 12/1981 | Narumiya et al. | 422/180 |
| 4,334,574 | 6/1982 | Sato et al. | 60/311 |
| 4,363,644 | 12/1982 | Sato et al. | 55/DIG. 30 |

*Primary Examiner*—David L. Lacey
*Attorney, Agent, or Firm*—Cushman, Darby & Cushman

[57] ABSTRACT

A ceramic structure including a metallic body such as an electric heater. The metallic body is retained in a retaining portion of the ceramic structure in such a manner that a minute cavity is provided around the metallic body. This ceramic structure is produced by forming an organic film around the metallic body, preparing a ceramic structure including the metallic body surrounded with the organic film in a retaining portion of the ceramic structure, and heating the resultant structure so as to decompose the organic film, whereby a minute cavity is formed around the metallic body.

6 Claims, 14 Drawing Figures

ELECTRICAL HEATER RETAINED IN A POROUS CERAMIC STRUCTURE

BACKGROUND OF THE INVENTION

1. Field of the Invention

The present invention relates to a ceramic structure, more specifically, to a ceramic structure including a metallic body therein and, also, relates to a production process thereof.

2. Description of the Prior Art

There are several problems with conventional ceramic structures including metallic bodies. When the ceramic portion is formed around the metallic body in contact thereto, it tends to crack and break when the whole ceramic structure is subjected to a high temperature, especially when the metallic body is heated to a temperature higher than that of the ceramic portion. This is a result of the large difference between the thermal coefficients of expansion of the metal and the ceramic. The metallic body expands more than the space surrounded it and causes strain in the ceramic structure.

When the ceramic portion is formed around the metallic body with a large cavity provided therebetween to absorb the difference in the thermal expansion, the metallic body is not stably supported and will move around considerably, therefore, may not be properly retained in the resultant ceramic structure. This is especially true when the ceramic structure is used under a vibrating condition. Furthermore, when the metallic body is a heater for heating the ceramic structure, larger thermal resistance is caused by the large cavity between the metallic heater and the ceramic portion, reducing the thermal conductivity to the ceramic portion. Thus, the heater must be operated at much higher temperatures than ordinarily necessary in order to satisfactorily heat the ceramic structure. This results in burnout of the heater element when the ceramic structure should be heated to an extremely high temperature and in wasteful power consumption.

SUMMARY OF THE INVENTION

An object of the present invention is to eliminate the above-mentioned problems in the prior arts by providing a ceramic structure including a metallic body therein which is capable of absorbing the difference in the thermal expansion between the metallic body and the ceramic portion, improving the retention of the metallic body, and improving the thermal conductivity between the metallic body and the ceramic structure.

Another object of the present invention is to provide a process for accurately and readily producing the above-mentioned ceramic structure including the metallic body therein.

Other objects and advantages of the present invention will be apparent from the description set forth hereinbelow.

In accordance with the present invention, there is provided a ceramic structure including a metallic body therein and a retaining portion for the metallic body, said metallic body being retained in the retaining portion in such a manner that a minute cavity is provided around the metallic body.

In accordance with the present invention, there is also provided a process for producing a ceramic structure including a metallic body therein, comprising the steps of: forming an organic film around the metallic body preparing a ceramic structure including the metallic body surrounded with the organic film in a retaining portion of the ceramic structure; and heating the resultant structure so as to decompose the organic film, whereby a minute cavity is formed around the metallic body.

BRIEF DESCRIPTION OF THE DRAWINGS

The present invention will be better understood from the description set forth below with reference to the accompanying drawings, wherein.

DESCRIPTION OF THE PREFERRED EMBODIMENTS

The present invention will now be illustrated in detail with reference to, but is by no means limited to, a ceramic structure including an electric heater suitable for use in the purification of exhaust gas from an internal combustion engine.

FIGS. 1 to 4 illustrate a ceramic structure including an electric heater according to the first embodiment of the present invention. Ceramic structure 1 comprises exhaust gas purifying part 2 composed of porous ceramic (e.g., foamed ceramic), outer wall 3 surrounding the porous ceramic, and electric heater 5. The porous ceramic is composed of ceramic skeleton 2b having a three-dimensional network structure in which are included many open type cells 2a communicated with the outside. This porous ceramic effectively catches fine carbon powder in exhaust gas at an excellent, high efficiency. Outer wall 3 prevents the leakage of the exhaust gas from the peripheral portion of the porous ceramic and, also, reinforces exhaust gas purification part 2, which has a relatively weak mechanical strength. Groove 4 is provided at one end surface of ceramic structure 1. In groove 4, electric heater 5 having a shape similar to that of the groove is mounted in such a manner that minute cavity 8 is formed around the electric heater. Electric heater 5 is retained in the groove by means of ceramic adhesive 6. Terminals 7 come out from portion "B" (see FIG. 1). Examples of electric heater 5 desirably used in the present invention are sheathed heater, comprising electric heater wire elements or electric resistance wire elements such as nichrome wires surrounded with protective tubes made of, for example, stainless steel. The gaps between the wire elements and the protective tubes are filled under pressure with electric insulating materials such as magnesium oxide.

Figure 4:
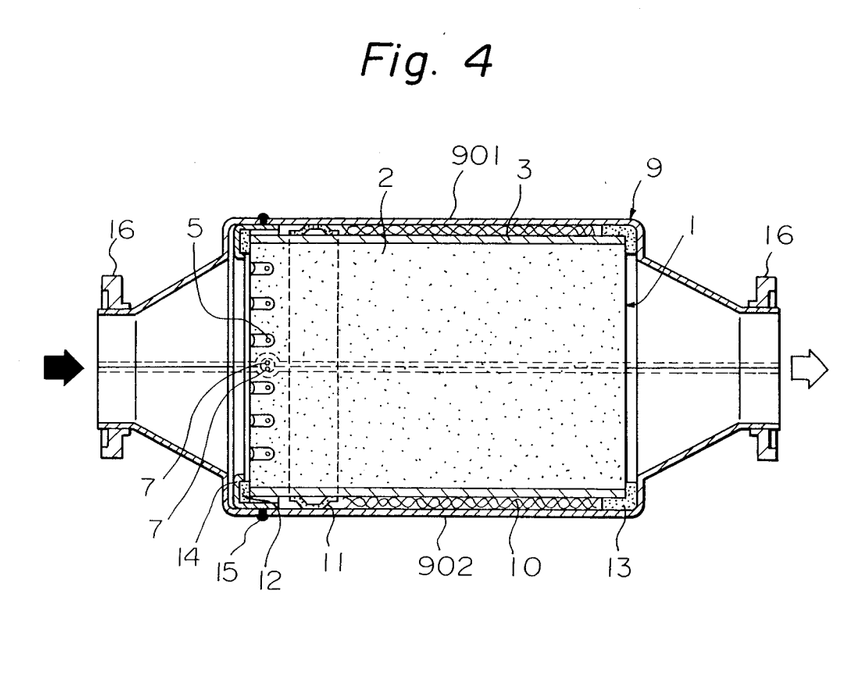
FIG. 4 is a cross-sectional view illustrating an exhaust gas purifier (i.e., an apparatus for removing fine powder from exhaust gas) including the ceramic structure according to the first embodiment of the present invention, taken along the axial direction of the purifier.
Figure 5:
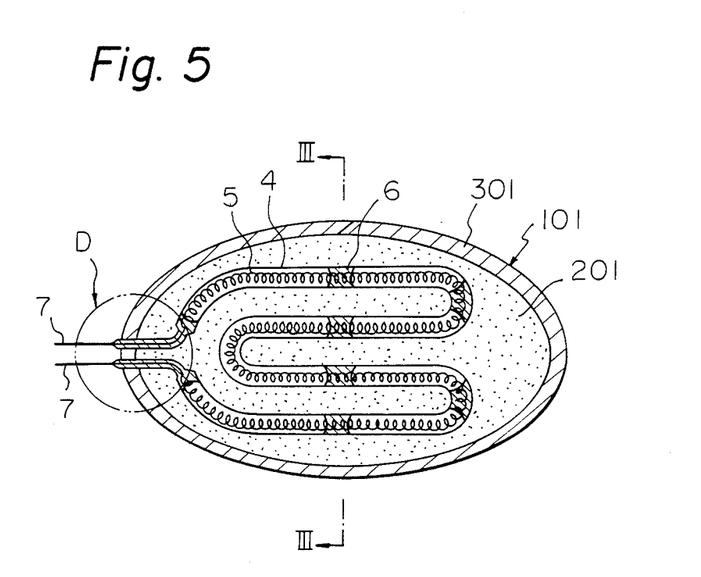
FIG. 5 is a cross-sectional view illustrating an electric heater placed in a ceramic structure according to a second embodiment of the present invention, taken along the line intersecting the central axis of the ceramic structure at right angles.
Figure 6:
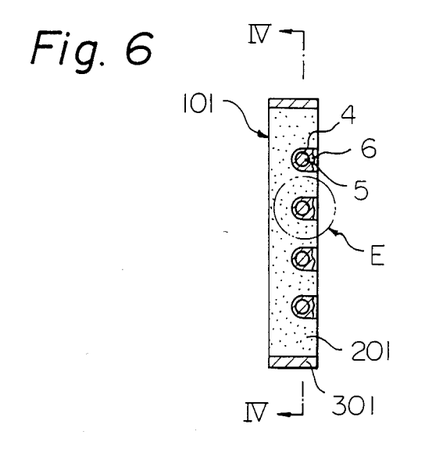
FIG. 6 is a cross-sectional view illustrating a ceramic structure according to the second embodiment of the present invention, taken along the line III—III of FIG. 5 (that is, a direction along the central axis of the ceramic structure), with line IV—IV being the line along which was taken FIG. 5.
Figure 7:
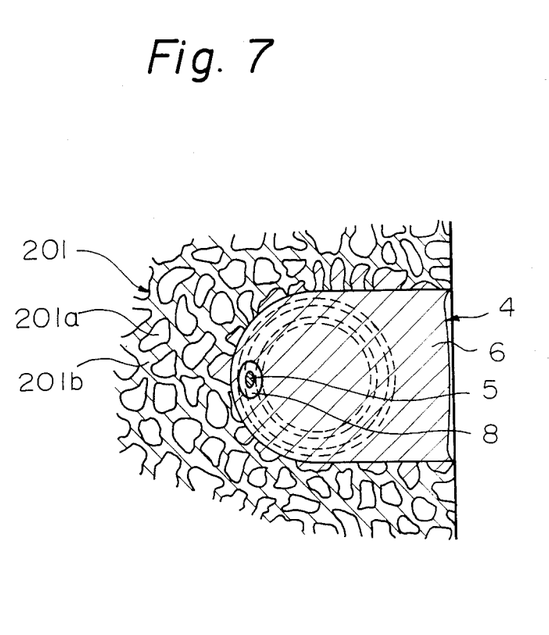
FIG. 7 is an enlarged partial view of portion "E" in FIG. 6, illustrating in detail the structure around the electric heater.

As shown in FIG. 4, ceramic structure 1, having the above-mentioned construction, is covered at the peripheral side portion with buffer member (or wire net) 10 composed of knitted metallic wires in a corrugated form and with ring sealing member 11 composed of knitted metallic wires in a corrugated form. This assembly is mounted in vessel 9 under pressure. Vessel 9 is formed by welding upper-half vessel 901 and lower-half vessel 902, both formed from, for example, a stainless steel plate, by press work. Thus, ceramic structure 1 is elastically supported in the radial direction, whereby ceramic structure 1 is protected from radial vibration and shock. Furthermore, leakage of the exhaust gas between the inside surface of vessel 9 and the outer peripheral surface of ceramic structure 1 is prevented. Ring sealing member 11 usable in the present invention includes, for example, thin metallic wires knitted and compression molded in a corrugated form to a high density, as shown in FIG. 4, or ceramic fibers (not shown) compression molded in a hand plate form after incorporating an expanding agent such as mica into the fibers.

Cushions 12 and 13 composed of knitted and compression molded thin metallic wires in a form having relatively low density are elastically mounted and pressed with retention ring 14 in the axial direction at the front and rear ends of ceramic structure 1. Retention ring 14 is connected to vessel 9 at plug welded joint 15 and elastically supports ceramic structure 1 in the axial direction. Thus, ceramic structure 1 is protected from the axial vibration and shock.

Terminals 7 of electric heater 5 come out from the side of vessel 9 for connection, via a switch (not shown), to a battery. Flanges 16 are welded at the inlet and outlet portions of vessel 9 through which exhaust gas flows. Vessel 9 can be bolted through flanges 16 to, for example, an exhaust pipe line from an internal combustion engine, such as a diesel engine.

The production process of the above-mentioned ceramic structure will now be explained.

An organic foam, such as urethane foam, composed of a skeleton of a three-dimensional network structure having a pore size of about 5 to 20 mesh and having open cells communicated with the outside is cut in the form of an ellipsoid for use as exhaust gas purifying part 2. The cell wall is eliminated. An organic foam, such as urethane foam, having the same structure as that of the above-mentioned foam but having a pore size of about 30 to 40 mesh is cut in the form of a thin plate for use as outer wall 3.

Figure 1:
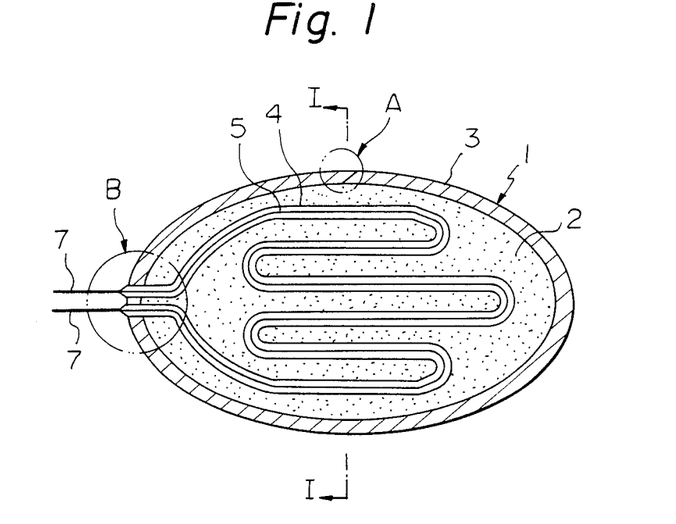
FIG. 1 is a cross-sectional view illustrating an electric heater placed in a ceramic structure according to a first embodiment of the present invention, taken along the line intersecting the central axis of the ceramic structure at right angles.
Figure 2:
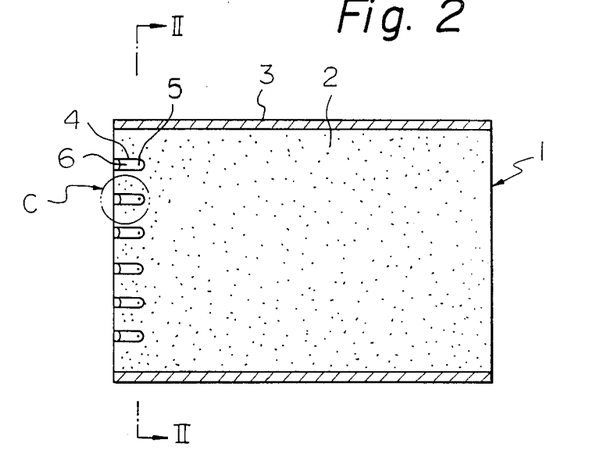
FIG. 2 is a cross-sectional view illustrating a ceramic structure according to the first embodiment of the present invention, taken along line I—I of FIG. 1 (that is, a direction along the central axis of the ceramic structure) with line II—II being the line along which was taken FIG. 1.

The outer wall foam is wound around the periphery of the purifying part foam under slight tension so as to butt-join the ends of the outer wall foam, as shown in portion A of FIG. 1. The outer surface of the joint portion is covered with a pressure-sensitive organic adhesive tape to form an assembly comprising the purifying part foam elastically wound with the outer wall foam. Then, a groove forming heater (not shown) composed of, for example, an electric heater shaped similar to groove 4 is heated to a temperature greater than the decomposition temperature of the urethane foam and is applied to the end surface of the assembly. This decomposes a section of the urethane foam in a shape similar to that of the groove forming heater and forms groove 4.

The assembly is then dipped in ceramic slurry, containing for example, 1500 g of finely divided cordierite having a particle size of smaller than 200 mesh, 100 g of polyvinyl alcohol, and 2000 g of water, until sufficiently impregnated. The excess slurry is then removed from the assembly by means of a centrifugal separator or compressed air, and the assembly is dried at a temperature of, for example, 100° C. to 120° C. for an appropriate time (e.g., 3 hours). This dipping and drying operation results in the deposition of finely divided ceramic powder in the skeleton of the purifying part foam and outer wall foam.

The dipping and drying operation is repeated until substantially all the communicating holes in the outer wall foam are filled with the fine ceramic powder. The assembly is then calcined at a temperature of, for example, 1300° C. to 1470° C. for an appropriate time (e.g., 5 hours) to decompose the polyurethane foam skeleton. The result is a porous ceramic having a three-dimensional network of communicating spaces.

The skeletons of the porous ceramic of purifying part 2 and outer wall 3 are directly connected together after the calcination of the purifying part foam and the outer wall foam, since the skeletons of the purifying part foam and the outer wall foam were elastically contacted together. This increases the joining strength of the ceramic skeletons and, therefore, enables a ceramic structure having extremely high mechanical strength and thermal shock resistance.

Figure 3:
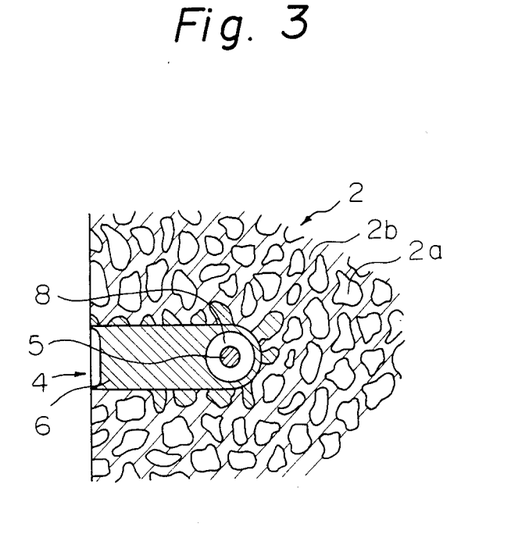
FIG. 3 is an enlarged partial view of portion "C" in FIG. 2, illustrating in detail the structure around the electric heater.

Thereafter, an organic film, such as polyurethane film, is applied to the surface of electric heater 5 in a thickness similar to that of minute cavity 8. The desired gap of the minute cavity is from 1 $\mu$m to 0.5 mm. The application of an organic film having a substantially constant thin thickness around the metallic body forming electric heater 5 can be readily and accurately carried out by, for example, coating an organic substance dissolved in a solvent to the surface of the metallic body. Then, coated electric heater 5 is placed in groove 4, together with ceramic adhesive 6 to fix the heater. After ceramic adhesive 6 is sufficiently solidified and dried, electric current is applied to electric heater 5 to decompose the organic compound film. Thus, minute cavity 8 having a uniform gap around electric heater 5 can be accurately and readily formed.

The decomposition of the organic film coated on the surface of electric heater 5 can also be effected by assembling ceramic structure 1 into vessel 9 as shown in FIG. 4. Vessel 9 is then connected to the exhaust pipe line from an internal combustion engine and the organic film is decomposed by heating the ceramic structure by means of high temperature exhaust gas.

As explained above, according to the present invention, above-mentioned minute cavity 8 can be formed by (1) forming an organic film around the metallic body forming electric heater 5, (2) preparing ceramic structure 1 including, in a retaining portion thereof, the metallic body coated with the organic film, and (3) decomposing the organic film by heating the film. Thus, minute cavity 8 having a substantially constant gap is effectively, readily and accurately formed around the metallic body forming electric heater 5.

The function of ceramic structure 1 will now be explained in detail. Exhaust gas discharged from, for example, an internal combustion engine and containing a large amount of fine carbon powder can be introduced into exhaust gas purifying part 2, composed of a three-dimensional network porous ceramic, in the direction illustrated by the black arrow in FIG. 4. The exhaust gas entering the porous ceramic drastically changes in flow direction due to the extremely complicated and tangled communicating holes of the three-dimentional network. The exhaust gas contacts with an extremely large surface area of the three-dimensional network porous ceramic. Since the exhaust gas effectively contacts the structural wall of the ceramic structure and there is an extremely large interaction between the exhaust gas and the structural wall, the fine carbon powder particles in the exhaust gas are effectively deposited and captured on the surface of the structural wall of the ceramic structure. As a result, the fine carbon powder particles are removed from the exhaust gas at a high efficiency. The purified gas is discharged from exhaust gas purifying part 2 in the direction shown by the white arrow in FIG. 4. Porous outer wall 3, which has no communicating holes, prevents the decrease in the gas purification efficiency of the ceramic structure due to leakage of exhaust gas from the peripheral portion of the ceramic structure.

Exhaust gas purifying part 2 of ceramic structure 1 clogs as the fine carbon powder particles in the exhuast gas are captured. This clogging results in decreased output of the internal combustion engine and in greater fuel costs. Accordingly, regeneration, i.e., an operation restoring ceramic structure 1 to its original state, should be carried out. This regeneration can be simply and readily carried out by heating ceramic structure 1 of the present invention by means of electric heater 5.

Deposition of the fine carbon powder particles in ceramic structure 1 in an amount more than a predetermined value can be detected by, for example, the traveling distance, cumulative engine speed, and the pressure difference between the inlet and outlet portions of the ceramic structure. When the amount of the carbon powder particles deposited becomes greater than the predetermined value, a battery (not shown) is switched on to heat electric heater 5, whereby fine carbon powder particles deposited in inner communicating holes 2a around ceramic skeleton 2b are locally heated to a temperature greater than their ignition or catch fire temperature (about 600° C.). As a result, the carbon powder particles deposited on the ceramic skeleton around minute cavity 8 are oxidized and burned by the oxygen remained in exhaust gas (exhaust gas from a diesel engine especially contains a large amount of oxygen). Once the carbon powder starts burning, the combustion continues to spread due to the heat of combustion of the carbon powder itself. Thus, the carbon powder particles captured and deposited in gas purifying part 2 are burned up to eliminate clogging, whereby the regeneration of ceramic structure 1 is completed.

In the regeneration step of ceramic structure 1, both electric heater 5 and the ceramic portion around the heater are subjected to a high temperature due to the heating of electric heater 5 and the combustion of the fine carbon powder. Since the thermal expansion coefficient of the metal constituting electric heater 5 is larger than that of the ceramic forming the retaining portion for electric heater 5, the expansion of electric heater 5 is larger than that of the ceramic. However, since minute cavity 8 is provided around electric heater 5 according to the present invention, the difference in the expansion amounts is absorbed. Thus, no strain is caused by the difference in the thermal expansion coefficients between electric heater 5 and the ceramic forming the retaining portion. The size of the gap of minute cavity 8 is determined based on the difference in the thermal expansion between the metal and the ceremic, taking into account the expected maximum usage temperature. The gap is desirably somewhat larger than the difference in the thermal expansion, because the retention property of the metallic body and the heat conductivity between the metallic body and the ceremic can be optimized without causing strain due to the difference in the thermal expansion.

FIGS. 5 to 8 illustrate a ceramic structure including an electric heater according to the second embodiment of the present invention.

According to this embodiment, electric heater 5 is spirally wound is the form of a coil whereby electric heater elements are densely mounted in a retaining portion of ceramic structure 101. Thus, the electric density can be locally increased. This further reduces the electric power required to regenerate the ceramic structure, compared with the first embodiment of the present invention, since the fine carbon powder can be ignited by less electric power them that of the first embodiment of the present invention. Heater terminals 7 come out from portion "D" (see FIG. 5).

Electric heater 5 is retained by ceramic adhesive 6 formed at parts of the ceramic structure by the injection of ceramic adhesive. This allows the number of adhesive retaining portions to be minimized with no substantial decrease in the retention property of the electric heater.

As in the case of the first embodiment of the present invenion, minute cavity 8 (see FIG. 7) is formed by forming an organic film around electric heater 5 and burying the electric heater, together with ceramic adhesive 6, in groove 4. Exhaust gas purifying part 201 comprises inner communicating holes or spaces 201a and ceramic skeleton 201b.

Figure 8:
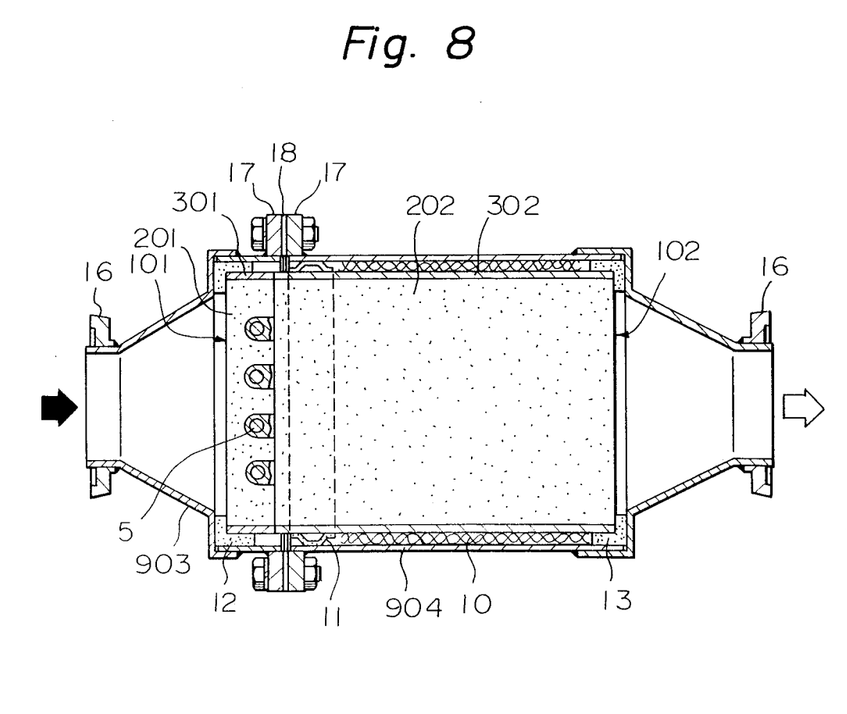
FIG. 8 is a cross-sectional view illustrating an exhaust gas purifier including the ceramic structure according to the second embodiment of the present invention, taken along the axial direction of the purifier.

The ceramic structure is desirably divided into portion 101 containing electric heater 5 and portion 102 containing no electric heater. The two portions 101 and 102 are mounted in two divided vessels 903 and 904, respectively, under pressure. After approriately treating the heater terminals (not shown), portions 101 and 102 are elastically connected by, for example, bolting the two vessels 903 and 904 through flanges 17 via gasket 18. Thus, even if the electric heater is broken at an early stage, only portion 101 containing the electric heater need be exchanged and the cost of repair can be reduced.

Figure 9:
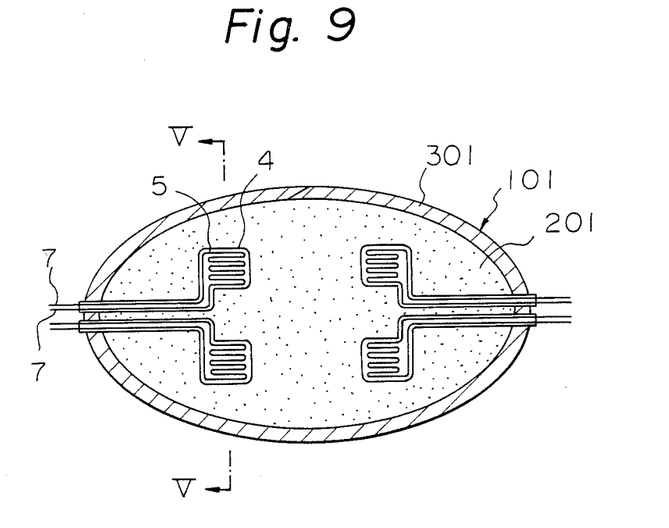
FIG. 9 is a cross-sectional view illustrating an electric heater placed in a ceramic structure according to a third embodiment of the present invention, taken along the line (intersecting the central axis of the ceramic structure at right angles)
Figure 10:
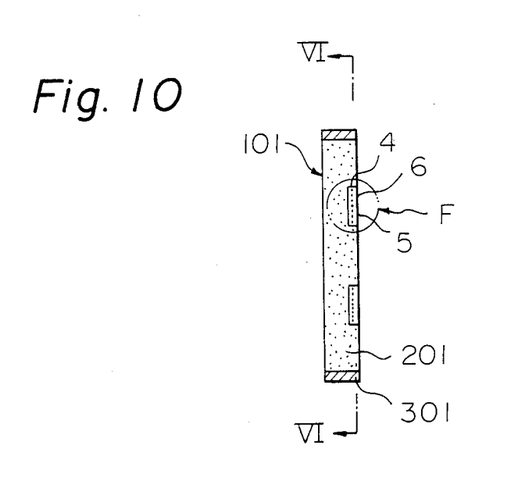
FIG. 10 is a cross-sectional view illustrating a ceramic structure according to the third embodiment of the present invention, taken along the line V—V of FIG. 9 (that is, a direction along the central axis of the ceramic structure), with line VI—VI being the line along which was taken FIG. 9.
Figure 11:
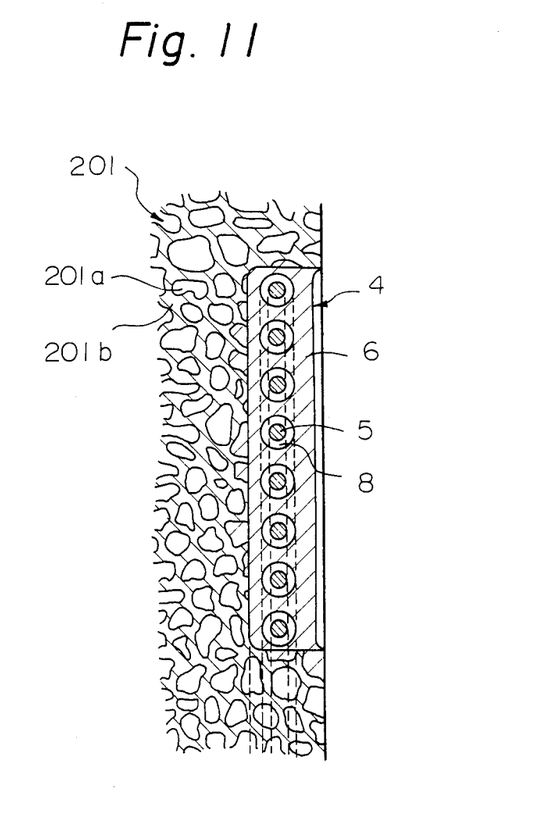
FIG. 11 is an enlarged partial view of portion "F" in FIG. 10, illustrating in detail the structure around the electric heater.

FIGS. 9 to 11, illustrate a ceramic structure including an electric heater according to the third embodiment of the present invention.

According to this embodiment, electric heaters 5 are concentrated or gathered at several portions in the end surface of ceramic structure 101. The heater elements are more densely and locally mounted as compared with the second embodiment of the present invention. Thus, the electric density can be further locally concentrated as compared with the above-mentioned first and second embodiments of the present invention and, therefore, the fine carbon powder can be ignited by an even smaller electric power and the regeneration of the ceramic structure can be effected with even lower power consumption.

Also in this embodiment, minute cavity 8 (see FIG. 11) is formed by forming an organic film around electric heater 5 and burying the electric heater, together with ceramic adhesive 6, in groove 4. The formation of minute cavity 8 by using an organic film is especially effective to increase the electric density when the clearance or distance between the adjacent electric heater elements is very small, as in this embodiment. This is because it also prevents short-circuits of the electric heater elements due to contact of the elements during, for example, installation of the heater elements.

Figure 12:
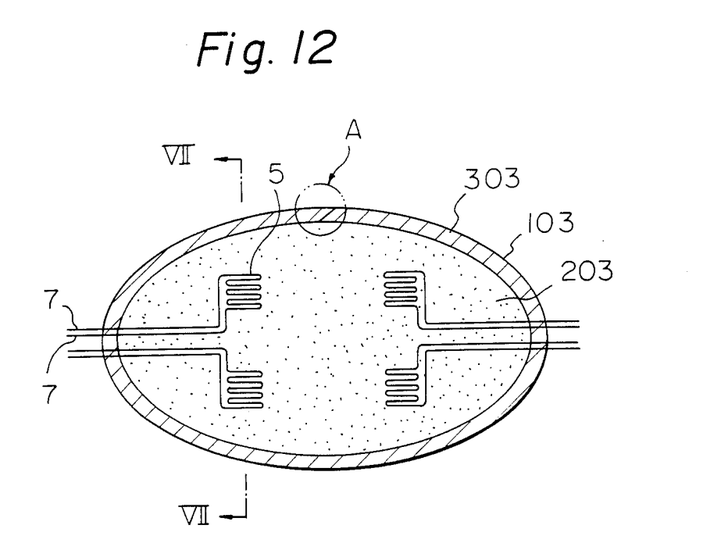
FIG. 12 is a cross-sectional view illustrating an electric heater placed in a ceramic structure according to a fourth embodiment of the present invention, taken along the line intersecting the central axis of the ceramic structure at right angles.
Figure 13:
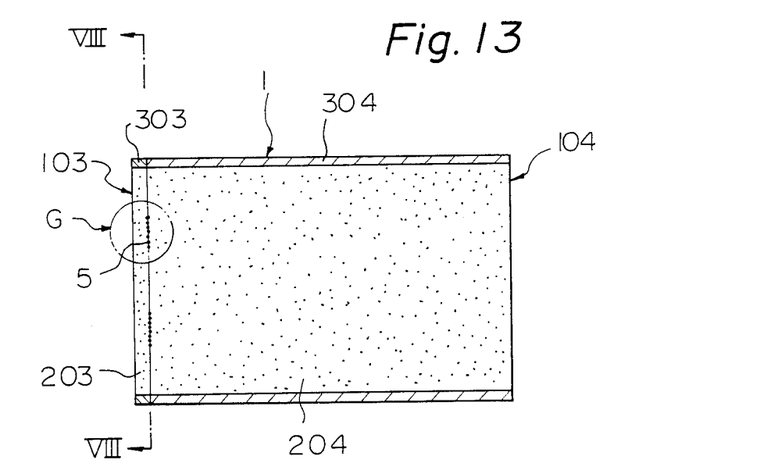
FIG. 13 is a cross-sectional view illustrating a ceramic structure according to the fourth embodiment of the present invention, taken along line VII—VII of FIG. 12 (that is, a direction along the central axis of the ceramic structure), with line VIII—VIII being the line along which was taken FIG. 12.
Figure 14:
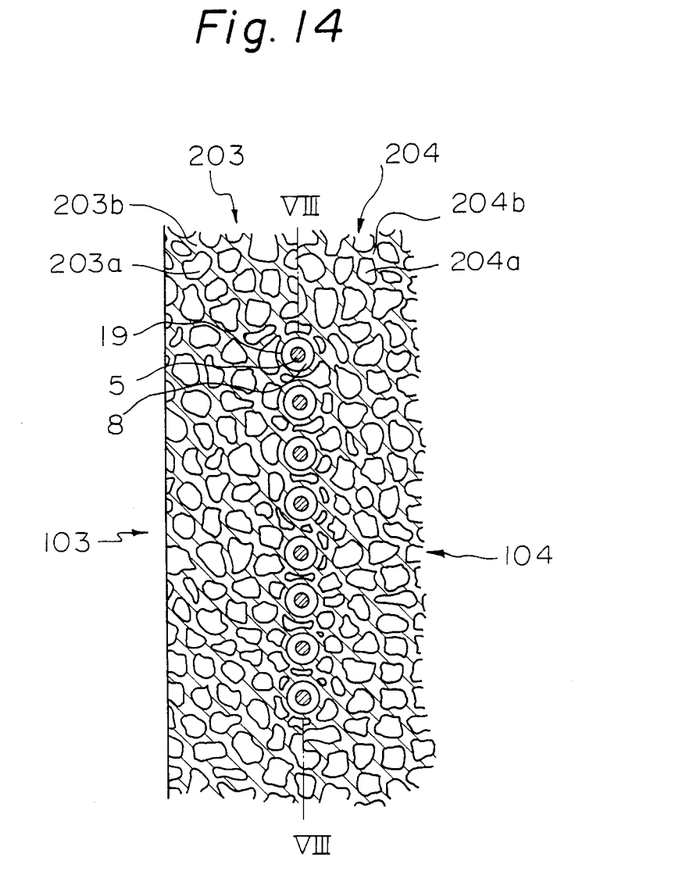
FIG. 14 is an enlarged partial view of portion "G" in FIG. 13, illustrating in detail the structure around the electric heater.

FIGS. 12 to 14 illustrate a ceramic structure including an electric heater according to the fourth embodiment of the present invention.

According to this embodiment, a retaining portion for retaining electric heater 5 is calcined together with ceramic structure 1 as shown, in detail, in FIG. 14.

The production process of this ceramic structure will now be explained in particular reference to portions different from the above-explained other embodiments. An organic foam, such as urethane foam, composed of a skeleton of a three-dimensional network structure having a pore size of about 5 to 20 mesh and having open cells communicated with the outside is cut in the form of an ellipsoid for use as exhaust gas purifying parts 203 and 204. The cell wall or film is eliminated. An organic foam, such as urethane foam, having the same structure as that of the above-mentioned foam but having a pore size of about 30 to 40 mesh is cut in the form of a thin plate for use as outer walls 303 and 304.

The outer wall foam is wound around the periphery of the exhaust gas purifying part foam under slight tension so as to butt-join the ends of the outer wall foam, as shown in portion A of FIG. 12. The outer surface of the joint portion is covered with a pressure-sensitive organic adhesive tape, to form an assembly comprising the purifying part foam elastically wound with the outer wall foam. Thus, upstream side ceramic body 103 and downstream side ceramic body 104 are prepared.

The surface of electric heater 5, made of an anti-corrosive metal, such as platinum, and having a melting point higher than the calcining temperature of the ceramic, is coated with an organic film (e.g., polyurethane film) or an organic adhesive film (e.g. polyester film or cellulose film) having a thickness similar to that of minute cavity 8. The coated electric heater is interposed between the above-prepared organic foam assemblies. The resultant assembly is elastically combined by applying an organic adhesive to parts of the contact surface of the organic foam assemblies, taking care not to clog the internally communicating holes or spaces of the organic foam with the adhesive.

The resultant assembly is then dipped in ceramic slurry until sufficiently impregnated. The excess slurry is removed from the assembly by means of a centrifugal separator or compressed air, and the assembly is dried. Thus, fine ceramic powder is deposited on the urethane foam skeleton of each purifying and outer wall foam and the surface of the organic film formed on electric heater 5. The dipping and drying operation is repeated until substantially all the commumicating holes or spaces in the outer wall foam are filled with fine ceramic powder. The assembly is then calcined at a temperature of, for example, 1300° C. to 1470° C. for an appropriate time (e.g., 5 hours) to decompose the urethane foam skeleton and the organic film coated on the surface of electric heater 5. As a result, as shown in FIG. 14, ceramic retaining wall 19 encompasses electric heater 5 with minute cavity 8, and upstream side ceramic body 103 and downstream side ceramic body 104 each having three-dimensional network communicating spaces 203a and 204a, respectively, and also having three-dimensional network ceramic skeletons 203b and 204b, respectively, are formed. Three-dimensional network communicating spaces 203a and 204a are communicated with each other in the urethane foam contact face VIII—VIII. Three dimensional network ceramic skeletons 203b and 204b are directly connected with each other. As mentioned above, integrally calcined ceramic structure 1 including ceramic bodies 103 and 104 and electric heater 5 is prepared.

According to the fourth embodiment, ceramic structure 1 having a high mechanical strength and an excellent vibration resistance is provided, since ceramic skeletons 203b and 204b of upstream side ceramic body 103 and downstream side ceramic body 104 are directly connected.

As explained, in detail, above, according to the present invention, a minute cavity is provided around the metallic body retained in the retaining portion of the ceramic structure. This results in a ceramic structure having excellent high temperature resistance and vibration resistance due to the fact that strain and cracking are not generated when heating at a high temperature and to the excellent retention property of the metallic body and thermal conductivity between the metallic body and the ceramic structure.

When the ceramic structure is formed by porous ceramic composed of a ceramic skeleton having a three-dimensional network structure and having open type cells communicated with the outside and when said metallic body is an electric heater, there is provided a ceramic structure for purifying exhaust gas which can effectively remove fine carbon powder and the like from the exhaust gas derived from, for example, an internal combustion engine, such as a diesel engine, and which can be efficiently regenerated by burning out the fine carbon powder deposited in the ceramic structure at a low power consumption. The fine carbon powder deposited around the electric heater is locally and efficiently heated to an ignition temperature by the electric heater. Thereafter, the combustion is maintained by the heat of combustion of the carbon powder. Thus, the power consumption of the electric heater is minimized.

The present invention has been described in detail with particular reference to a ceramic structure, including an electric heater therein, for purifying exhaust gas from an internal combustion engine, but it will be understood that the present invention can also be effectively utilized for a linear or rod-like cartridge heater buried in a ceramic furnace material in a heating furnace. Furthermore, the present invention can be used for a metallic part placed or buried in a ceramic structure exposed to a high temperature.

We claim:

1. A porous ceramic structure having a minute cavity therein, an electrical heater placed in the cavity so as to define a constant space therearound and being retained therein by ceramic adhesive attached to the ceramic structure.

2. A porous ceramic structure as claimed in claim 1, wherein said electrical heater is placed such that said constant space is from $1\mu$ to 0.5 mm.

3. A porous ceramic structure as claimed in claim 1, wherein said porous ceramic structure is composed of a ceramic skeleton having a three-dimensional network structure and having open cells communicated with the outside of said porous ceramic structure.

4. A porous ceramic structure as claimed in claim 1, wherein said electrical heater is retained in only a portion of said porous ceramic structure.

5. A porous ceramic structure as claimed in claim 1, including a plurality of said minute cavities each containing an electrical heater, wherein said electrical heaters are concentrated at several portions in an end surface of the ceramic structure and the heater elements are densely mounted such that an electric density is locally concentrated.

6. A porous ceramic structure as claimed in claim 1, wherein said minute cavity that contains said electrical heater is formed in an end portion of the ceramic structure whereby the amount of ceramic adhesive retaining said electrical heater is minimized.

* * * * *